United States Patent [19]
Okumura et al.

[11] Patent Number: 5,601,739
[45] Date of Patent: Feb. 11, 1997

[54] METHOD AND APPARATUS FOR CONTROLLING ARC WELDING ROBOT

[75] Inventors: Shinji Okumura; Takahide Hirayama; Ryuichi Morita, all of Kitakyushu, Japan

[73] Assignee: Kabushiki Kaisha Yaskawa Denki, Fukuoka, Japan

[21] Appl. No.: 507,430

[22] PCT Filed: Mar. 15, 1994

[86] PCT No.: PCT/JP94/00407

§ 371 Date: Sep. 7, 1995

§ 102(e) Date: Sep. 7, 1995

[87] PCT Pub. No.: WO94/21416

PCT Pub. Date: Sep. 29, 1994

[30] Foreign Application Priority Data

Mar. 17, 1993 [JP] Japan .................... 5-084198

[51] Int. Cl.⁶ ........................................ B23K 9/095
[52] U.S. Cl. .................... 219/130.01; 219/125.1; 219/130.21; 901/42

[58] Field of Search ............... 219/130.01, 130.4, 219/125.1, 137 PS, 130.21; 901/42

[56] References Cited

U.S. PATENT DOCUMENTS

| | | | |
|---|---|---|---|
| 3,532,853 | 10/1970 | MacKinney et al. | 219/130.01 |
| 4,132,879 | 1/1979 | Glorioso | 219/130.01 |
| 4,772,776 | 9/1988 | Siina | 219/125.1 |

FOREIGN PATENT DOCUMENTS 4-84673  3/1992  Japan .

*Primary Examiner*—Clifford C. Shaw
*Attorney, Agent, or Firm*—Jordan and Hamburg

[57] ABSTRACT

Arc generation time is obtained for each region to be welded by measuring the time during which the arc current (or voltage) exceeds a reference current (or voltage) and is compared with predetermined time which is set depending on the welding operation. An abnormality is detected in welding if the arc generation time is shorter.

8 Claims, 3 Drawing Sheets

METHOD AND APPARATUS FOR CONTROLLING ARC WELDING ROBOT

BACKGROUND OF THE INVENTION

The present invention relates to a method and apparatus for controlling an arc welding robot which make it possible to determine welding failures in a welded region.

BACKGROUND ART

An industrial robot for arc welding operates at an instructed speed and in a pre-instructed. It commands a welding machine to start welding by dictating welding conditions (current, voltages, etc.) at the welding start point which is instructed in advance. Then, the welding machine starts welding and performs control so that the specified welding conditions are met until an end-welding command is received. Other types of controls, such as course control and I/O control, are performed by the robot. In general, until a stop request is received, the robot performs operations such as commanding the welding machine to change welding conditions in response to a welding condition change request and issuing an end-welding command to the welding machine in response to an end-welding request.

However, an interruption or failure in welding can occur unless such a robot is continuously monitored to see if the welding operation is being properly performed in accordance with the instructions. Since an interruption or failure can produce serious defects in the welded product, various monitoring functions are added to a robot.

For example, in order to ensure that a robot operates after an arc is generated when welding is started, the current flowing between the electrode and the base material to be worked on is checked at the robot or welding machine. The robot is allowed to start operating after it has been confirmed that the current has exceeded a preset value (after the generation of an arc). Interruption and failure during welding are avoided by the detection of failed arcing when the current between the electrode and the base material to be worked on falls below the preset value, or by checking the remaining amount of welding wire to spot any abnormality. The operator of the robot will be alerted to any abnormality, and will have welding continued again after eliminating the cause.

According to Japanese Patent Applications Nos. Hei 4-221970 and Hei 4-304951 made by the applicant, a robot does not stop even if arcing fails or is interrupted at the point where welding is started or in a region within the course of welding. Instead, the robot itself rewelds when such a problem occurs at the starting point, or returns to the position where arcing has been interrupted to reweld when the problem occurs in the course of welding. Thus, unwelded regions are eliminated and the robot can be continuously operated.

DISCLOSURE OF THE INVENTION

The former method makes it possible to detect an abnormality in welding and allows a welding operation to be continued if the operator performs a restart operation after eliminating the cause of the abnormality. However, it is inevitable that unwelded regions will remain in the workpiece if the operator makes an error in the restart operation or if welding is stopped and restarted without removing the cause of the abnormality.

The latter method is effective as a means for preventing operator errors as described above. However, if abnormal welding occurs and the robot is stopped after welding has been resumed automatically, because there is no way to eliminate the abnormality, it is inevitable that unwelded regions will be left in the workpiece to be welded, just as in the above-described case.

It is therefore an object of the present invention to provide a method and apparatus which will not leave unwelded regions in a workpiece to be welded even when abnormal welding occurs or the operator makes an error.

According to a first aspect of the present invention, there is provided a method of controlling an arc welding robot characterized in that the generation of an arc is detected to output an arc generation command by detecting an energized state wherein the arc current or arc voltage is equal to or greater than a predetermined value; the duration of the arc generation from the output of the arc generation command is measured for each unit welding operation; and the welding is determined to be abnormal if the measured value is shorter than preset time.

According to a second aspect of the present invention, there is provided an apparatus for controlling an arc welding robot characterized in that it includes a means for detecting the generation of an arc by detecting an energized state wherein the arc current or arc voltage is equal to or greater than a predetermined value, a means for issuing an arc generation monitoring start request, a means for measuring and storing the arc generation time in response to the arc generation monitoring start request, a means for storing allowable arc generation time, a means for issuing a request for output of the arc generation monitoring result, a means for comparing the allowable arc generation time and the measured arc generation time to determine abnormality in welding if the measured arc generation time is shorter.

The welding current or voltage is checked during welding, and the amount of time during which the current or voltage is equal to or greater than a preset value is integrated and has been compared to a preset time after one cycle of welding has been completed. This makes it possible to immediately determine whether the robot has performed welding properly. If the welding has not been performed properly, an alarm is issued to stop the robot (the robot may alternatively be kept operating).

Further, the alarm (welding abnormality signal) may be output to an external device to allow the workpiece containing the abnormality to be differentiated in the information transferred to subsequent process steps, or to allow the workpiece to be transported to a repair stage or the like. In addition, the history of the abnormality can be maintained in the control panel for the robot.

BEST MODE FOR CARRYING OUT THE INVENTION

A description will now be given of an apparatus for controlling an arc welding robot as an embodiment of the present invention.

Figure 1:
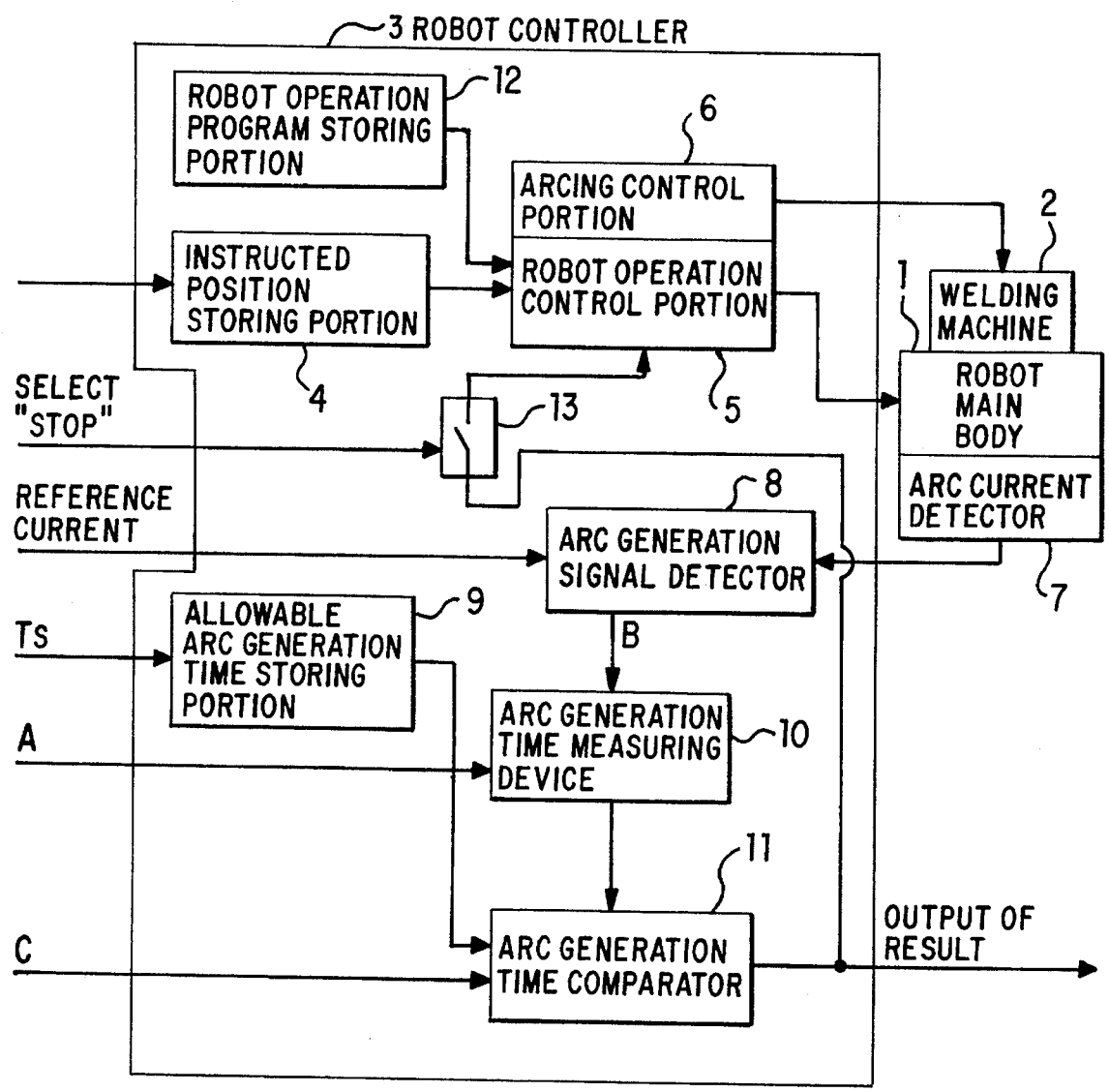
FIG. 1 is a block diagram showing an embodiment of the present invention.

FIG. 1 is a conceptual block diagram showing an example of a system for implementing the present invention wherein 1 designates a main body of the robot; 2 designates a welding machine; and 3 designates a robot controller.

The robot main body 1 refers to an instructed position stored in an instructed position storing portion 4 which has been set using an instruction operation box (not shown), and is driven by a robot operation control portion 5 based on a robot operation program stored in a robot operation program storing portion 12.

Arcing at the welding machine 2 is turned on/off under control of an arcing control portion 6. An arc current detector 7 (or an arc voltage detector) supplies the current detection signal (or voltage detection signal) obtained therein to 8 an arc generation signal detector which determines that an arc is generated if the current detection signal is greater than a reference current Is, which is preset using an instruction operation box (not shown).

An allowable arcing time storing portion 9 for storing an allowable arc generation time (Ts), is preset using the instruction operation box (not shown). The allowable arc generation time (Ts) is set based on the welding time for each weld line.

An arc generation time measuring device 10 for measuring the time during which an arc generation signal B output by the arc generation signal detector 8 is turned on after the reception of a request A for the starting of arc generation time measurement. Upon another request for the starting of arc generation time measurement, the measured arc generation time (Tg) is reset and time measurement is started from 0 each time.

An arc generation time comparator 11, which, in response to a request C for output of an arc generation monitoring result, compares the arc generation measurement time (Tg) measured by arc generation time measuring device 10 and the allowable arc generation time (Ts).

A robot operation stop selection portion 13 makes a selection in response to the detection of an abnormality in welding from the instruction operation box (not shown) on whether to only issue an alarm (to output the result) or to stop the robot.

While the arc generation time measurement start request and the arc generation monitoring result output request may be manually output using the instruction operation box, it is more practical to output them from the robot operation control portion 5. Specifically, instructions associated with the two requests are defined and included in the robot operation program at predetermined positions (steps) therein when the operations are instructed. This allows the measurement of arc generation time and the output of the arc generation monitoring result in a predetermined operational range to be performed automatically.

Figure 3:
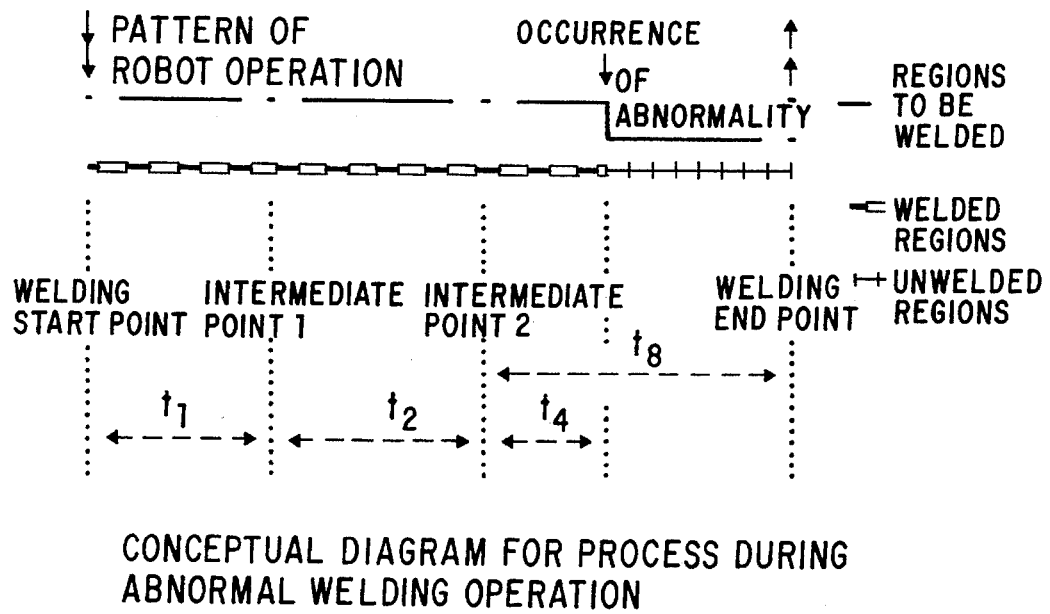
FIG. 3 illustrates a concept behind a process performed when there is abnormality in welding.
Figure 4:
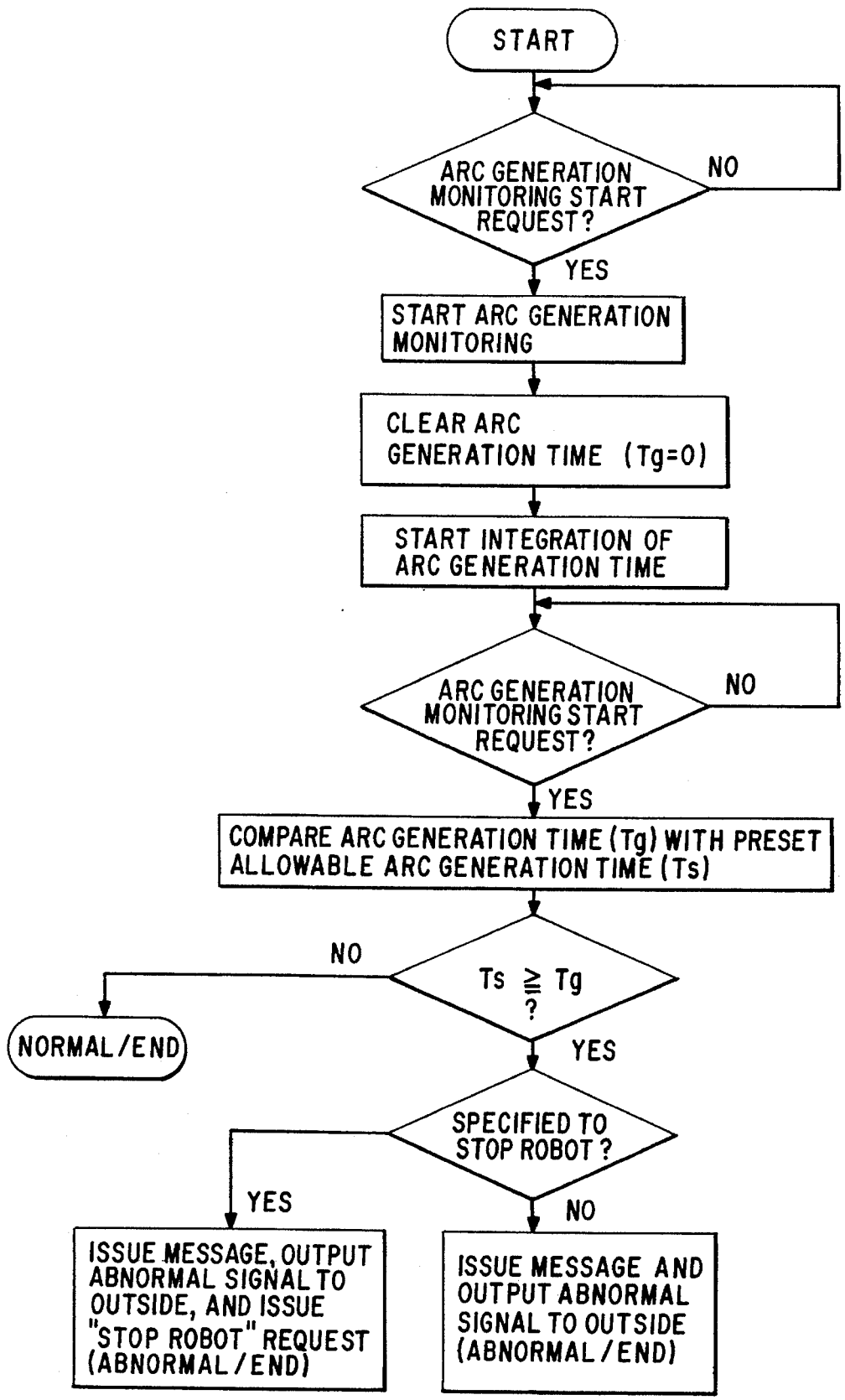
FIG. 4 is a flow chart for explaining the present embodiment.

FIG. 4 is a flow chart explaining the present embodiment. In order to make the description clearer, it will be made with reference to FIG. 3 and FIG. 4, which illustrate a concept behind a process performed when welding is performed properly and a concept behind a process performed when there is an anomaly in welding, respectively.

Figure 2:
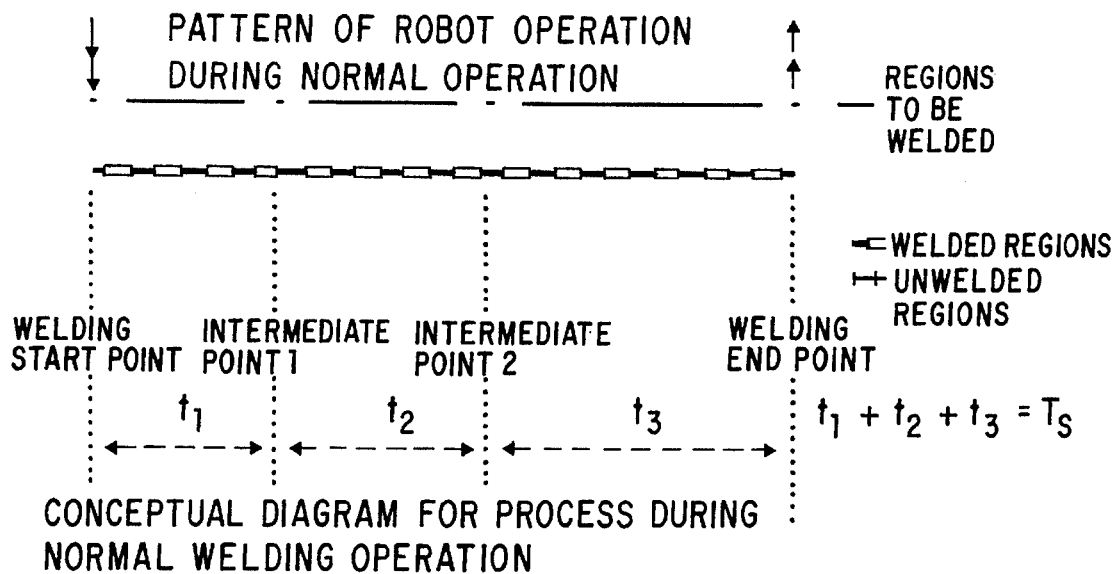
FIG. 2 illustrates a concept behind a process performed when welding is performed properly.

Referring to FIG. 2, a region to be welded is instructed using a welding start point, an intermediate point 1, an intermediate point 2, and an end point.

First, the time required for welding a region is defined as the sum of measured arc generation times t1, t2, and t3 between those points. This sum is referred to as allowable arc generation time (Ts). When an abnormality occurs during the course of welding and the operation is continued, with welding interrupted as shown in FIG. 3, the measured arc generation time for this region to be welded is the sum of t1, t2, and t4, which is shorter than the allowable arc generation time (Ts). This allows the existence of an unwelded region to be recognized.

A description will now be given of the flow chart for the present invention shown in FIG. 4.

When an arc generation monitoring start request is issued, arc generation monitoring is started by first clearing the arc generation time previously obtained, setting the time to zero. Arc generation time is then integrated until an arc generation monitoring result output request is issued.

When an arc generation monitoring result output request is issued, the arc generation time obtained until then is compared with a preset allowable arc generation time (Ts). If the arc generation time (Tg) is greater than the allowable arc generation time (Ts), it will be recognized that welding has been performed properly, without unwelded regions and the process will be terminated. If the arc generation time (Tg) is less than the allowable arc generation time (Ts), it will be recognized that the welding has failed. When failed welding is recognized, if it is not specified that the robot be stopped, a message indicating the occurrence of failure in the welding is issued to output the abnormality in direction to external devices, and the process is terminated. If it is specified that the robot be stopped, a robot stop request is issued and the process is terminated.

In Japanese Patent Applications No. Hei 4-221970, welding may be performed in a direction opposite the direction instructed in the case of an interruption of arcing. In such a case, inclusion of the time spent welding in the opposite direction in the measured arc generation time will create a problem. When welding can take place in the direction opposite the instructed direction, another embodiment of the present invention as described below will be used.

Specifically, the arc generation time is measured only when an energized state wherein the arc current or arc voltage is equal to or greater than a predetermined value is detected and the robot is moving in the instructed welding direction. Since the robot operation control portion always keeps track of the movement of the robot, this can be easily achieved by combining such data and the arc generation signal B.

As described above, according to the present invention, if an abnormality occurs during welding using an arc welding robot, or if the operator restarts the robot at an erroneous position after it has been stopped for some reason, it is possible to reliably detect whether the robot is in an unwelded region or not with a history of the above maintained. As a result, the robot can produce welded products without supplying unwelded workpieces produced by erroneous operations or accidents to the subsequent process steps.

We claim:

1. A method of controlling an arc welding robot performing a welding operation including at least one weld, the method comprising the steps of:

initiating execution of a program controlling said arc welding robot to perform said welding operation at a known linear rate;

detecting presence of arc generation by detecting an energized state wherein an arc current or arc voltage is equal to or greater than a predetermined value;

measuring a total time duration of the detected presence of arc generation from a beginning to an end of said performance of said welding operation;

comparing said total time duration to a predetermined time period prescribed for said welding operation when said arc welding robot has completed the welding operation; and determining that an abnormality exists when said total time duration is less than said predetermined time period.

2. The method for controlling said arc welding robot according to claim 1, wherein the total arc generation time is measured only when the robot is moving in an instructed welding direction associated with defect free operation.

3. An apparatus for controlling an arc welding robot comprising:

robot operation control means for controlling said arc welding robot having arc welding means for generating an arc and performing welds at a known linear rate in accordance with a robot operation program;

a means for detecting a presence of arc generation by detecting an energized state wherein an arc current or arc voltage is equal to or greater than a predetermined value;

a means for issuing an arc generation monitoring start request;

a means for measuring a total arc generation time in response to said arc generation monitoring start request by timing a total duration of said presence of arc generation;

a means for storing a required total arc generation time;

a means for issuing a request for the total arc generation time measured in response to the arc generation monitoring request at a completion of said welding program; and a means for comparing said allowable total arc generation time and said total arc generation time in response to said request for the output of arc generation monitoring result to determine abnormality in welding if said total arc generation time is shorter.

4. The apparatus for controlling an arc welding robot according to claim 3 characterized in that the means for issuing the arc generation monitoring start request and the means for issuing the arc generation monitoring result output request are provided by including said two request commands in said robot operation program for issuance by said robot operation control means during reading and executing the robot operation program.

5. The apparatus for controlling said arc welding robot according to claim 3 or claim 4, further comprising a means for issuing an alarm and stopping the arc welding robot upon a determination that an abnormality has occurred during welding.

6. The apparatus for controlling said arc welding robot according to claim 3 or claim 4, further comprising a first alarm means for issuing an alarm and stopping the arc welding robot when it has been determined that an abnormality has occurred during welding, a second alarm means for only issuing an alarm while leaving the arc welding robot operating when it has been determined that an abnormality has occurred during welding, and a means for selecting either of said first and second alarm means.

7. The method for controlling an arc welding robot according to any of claims 3 or 4, wherein the total are generation time is measured only when the arc welding robot is moving in an instructed welding direction associated with defect free operation.

8. The apparatus for controlling said arc welding robot according to claim 3 or claim 4, further comprising a means for issuing an alarm upon a determination that an abnormality has occurred during welding while allowing operation of the arc welding robot to continue.

* * * * *